United States Patent [19]
Tanimoto et al.

[11] Patent Number: 4,460,973
[45] Date of Patent: Jul. 17, 1984

[54] ELECTRONIC TRANSLATOR FOR MARKING WORDS OR SENTENCES

[75] Inventors: Akira Tanimoto, Kashihara; Mitsuhiro Saiji, Kyoto, both of Japan

[73] Assignee: Sharp Kabushiki Kaisha, Osaka, Japan

[21] Appl. No.: 298,114

[22] Filed: Aug. 31, 1981

[30] Foreign Application Priority Data

Sep. 3, 1980 [JP] Japan .............................. 55-122706

[51] Int. Cl.³ .............................................. G06F 15/38
[52] U.S. Cl. ...................................... 364/900; 364/419
[58] Field of Search ... 364/900 MS File, 200 MS File, 364/419

[56] References Cited

U.S. PATENT DOCUMENTS

| 4,218,760 | 8/1980 | Levy | 364/900 |
| 4,339,806 | 7/1982 | Yoshida | 364/900 |
| 4,373,192 | 2/1983 | Yanagiuchi et al. | 364/900 |
| 4,412,305 | 10/1983 | Yoshida | 364/900 |
| 4,417,379 | 11/1983 | Morimoto et al. | 364/900 |

FOREIGN PATENT DOCUMENTS 2014765 8/1979 United Kingdom .............. 364/900

Primary Examiner—Charles E. Atkinson
Assistant Examiner—Michael R. Fleming
Attorney, Agent, or Firm—Birch, Stewart, Kolasch & Birch

[57] ABSTRACT

An electronic translator of the type having an input device for inputting words and directing the output of selected words in which a first word or words represented in a first language are retrieved in response to a second word or words represented in a second language equivalent to the first word or words, wherein the improvement comprises a marking circuit for marking at least one selected data item of a plurality of data items each representing the second word or words to differentiate each selected data item from other data items in the second language, and an output circuit responsive to a command from the input device for outputting only the at least one selected data item which is marked by the marking circuit.

7 Claims, 8 Drawing Figures

ELECTRONIC TRANSLATOR FOR MARKING WORDS OR SENTENCES

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from any conventional type of electronic device in that the former is of a unique structure which provides for efficient and rapid retrieval of word information stored in a memory.

Since the translator retrieves a great quantity of word data or sentence data from a memory, in order to assure rapid retrieval, it is desired to minimize the quantity of the word data or the sentence data to be processed in each operation of data retrieval by the translator. For this purpose, it is preferable that a specific kind of word data or sentence data be marked for retrieval. The conventional translator, however, can not operate this function.

Therefore, it is highly desirable to provide such a translator for performing this function.

SUMMARY OF THE INVENTION

Accordingly, it is an object of the present invention to provide an improved electronic translator for marking and retrieving a specific kind of word data or sentence data selected from a great quantity of word data or sentence data.

It is another object of the present invention to provide an improved electronic translator for modifying a marked specific kind of word data or sentence data selected from a great quantity of word data or sentence data, the marked specific kind of word data or sentence data being memorized.

Briefly described, an electronic translator of the present invention is provided in which a first word or words represented in a first language are retrieved in response to a second word or words represented in a second language which are equivalent to the first word or words. The electronic translator comprises a marking circuit for marking at least one item of a plurality of data items each representing the second word or words, and an output circuit for outputting only the at least one item which is marked by the marking circuit.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

First of all, any language can be applied to an electronic translator of the present invention. An input word is spelled in a specific language to obtain an equivalent word, or a translated word spelled in a different language corresponding thereto. The languages can be selected freely.

Figure 1:
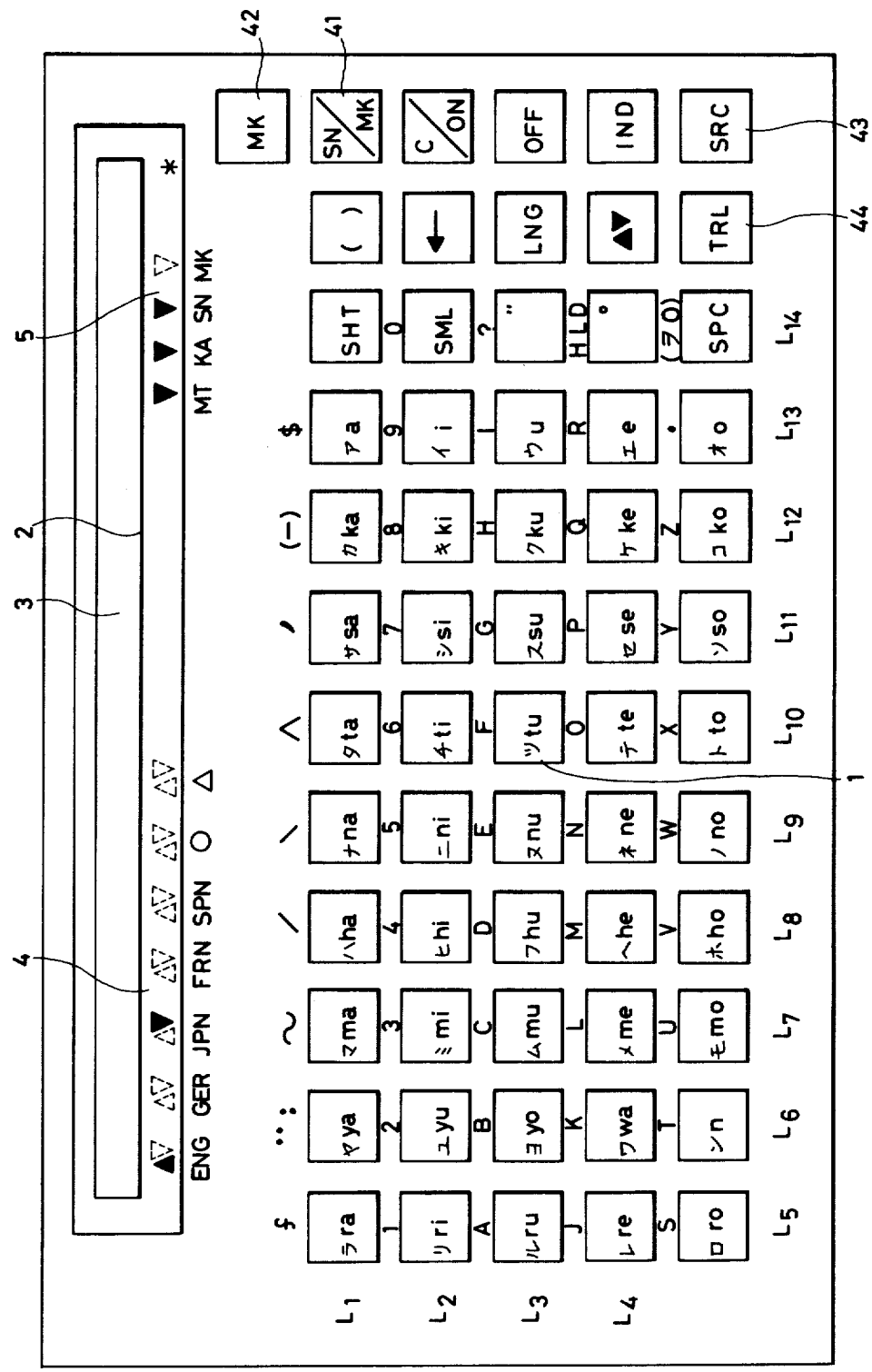
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character indicator 3, a language indicator 4 and a symbol indicator 5.

The character indicator 3 shows characters processed by this translator. The language indicator 4 shows symbols used for representing the kind of the mother language and the foreign language then being processed by the translator. The symbol indicator 5 shows symbols used for indicating operating conditions in this translator.

Figure 2:
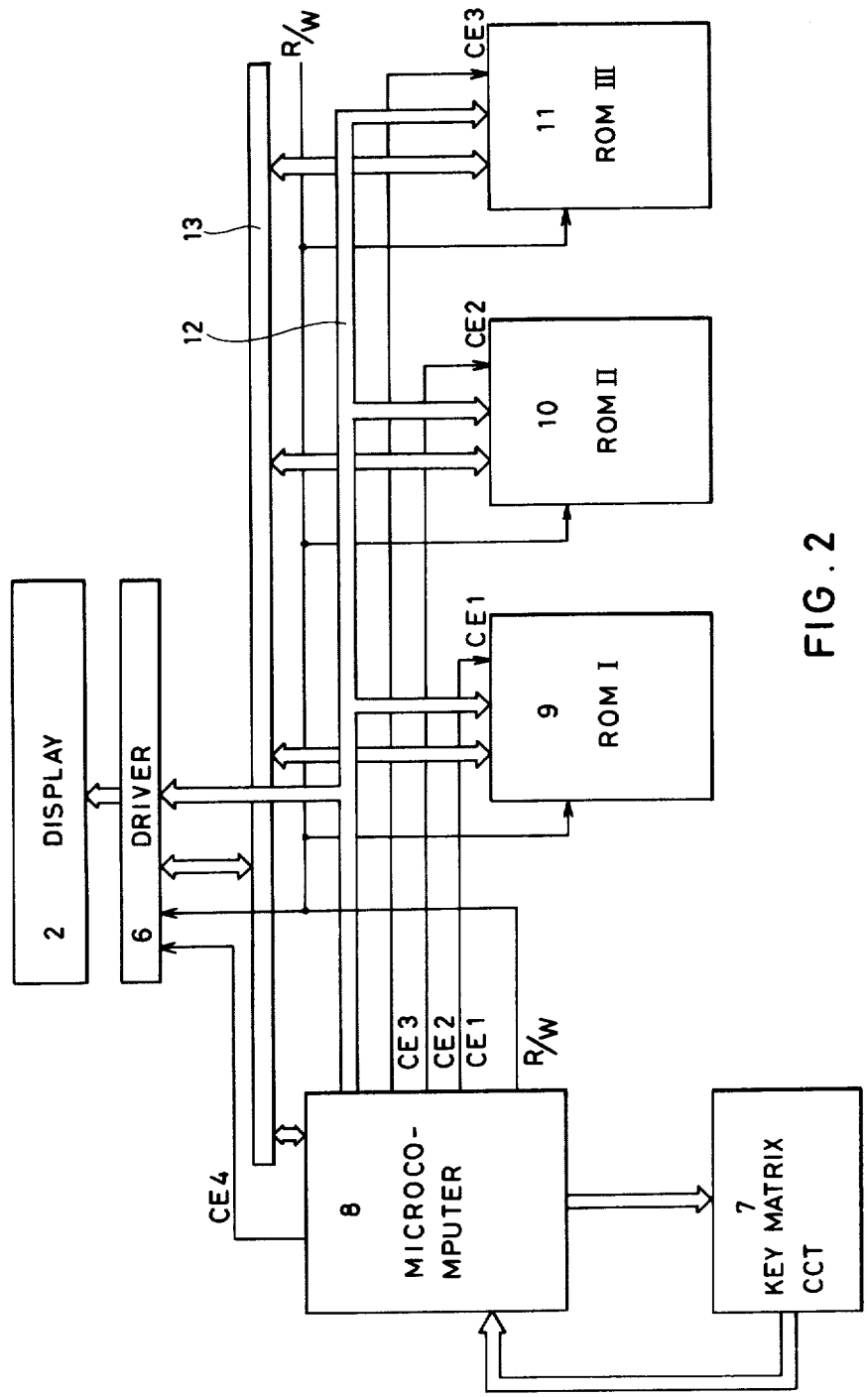
FIGS. 2, 3(a) and 3(b) show collectively a block diagram of a control circuit implemented within the translator as shown in FIG. 1.

FIG. 2 shows a block diagram of a control circuit implemented in the translator according to the present invention. The circuit comprises the indicator 2, a driver 6, a key matrix circuit 7, a microcomputer 8, ROM I 9, ROM II 10, and ROM III 11. The circuit 7 functions with the keyboard 1 of FIG. 1. The circuit 7 is connected to terminals of the microcomputer 8 for developing key strobe signals and key input signals. Each of the ROMs 9 to 11 contains words and/or sentences used by the translator.

According to a preferred embodiment of the present invention, each one of the ROM's 9 to 11 corresponds to one language. For example, the ROM I 9 stores a plurality of English words, the ROM II 10 stores a number of Japanese words and the ROM III 11 stores a number of German words. Preferably, the ROM I 9 is built into the translator so that it can not be removed from the translator for exchange purposes. However, it is preferable that each of the ROM II 10 and the ROM III 11 can be removed from the translator and replaced by another type of ROM as module ① or ② to permit the user to translate between the mother language (here English) and additional foreign languages such as French or Spanish (see FIG. 1).

Each of the ROM's 9 to 11 is connected to the microcomputer 8 through an address bus 12 and a data bus 13. Chip selection signals $CE_1$, $CE_2$ and $CE_3$ are developed by the microcomputer 8 to select one of the ROM's 9 to 11. Words and/or sentences are applied to the microcomputer 8 from the selected ROM. $CE_4$ indicates a chip selection signal for the driver 6. "R/W" indicates a read/write signal for selecting a read or write operation.

Figure 3A:
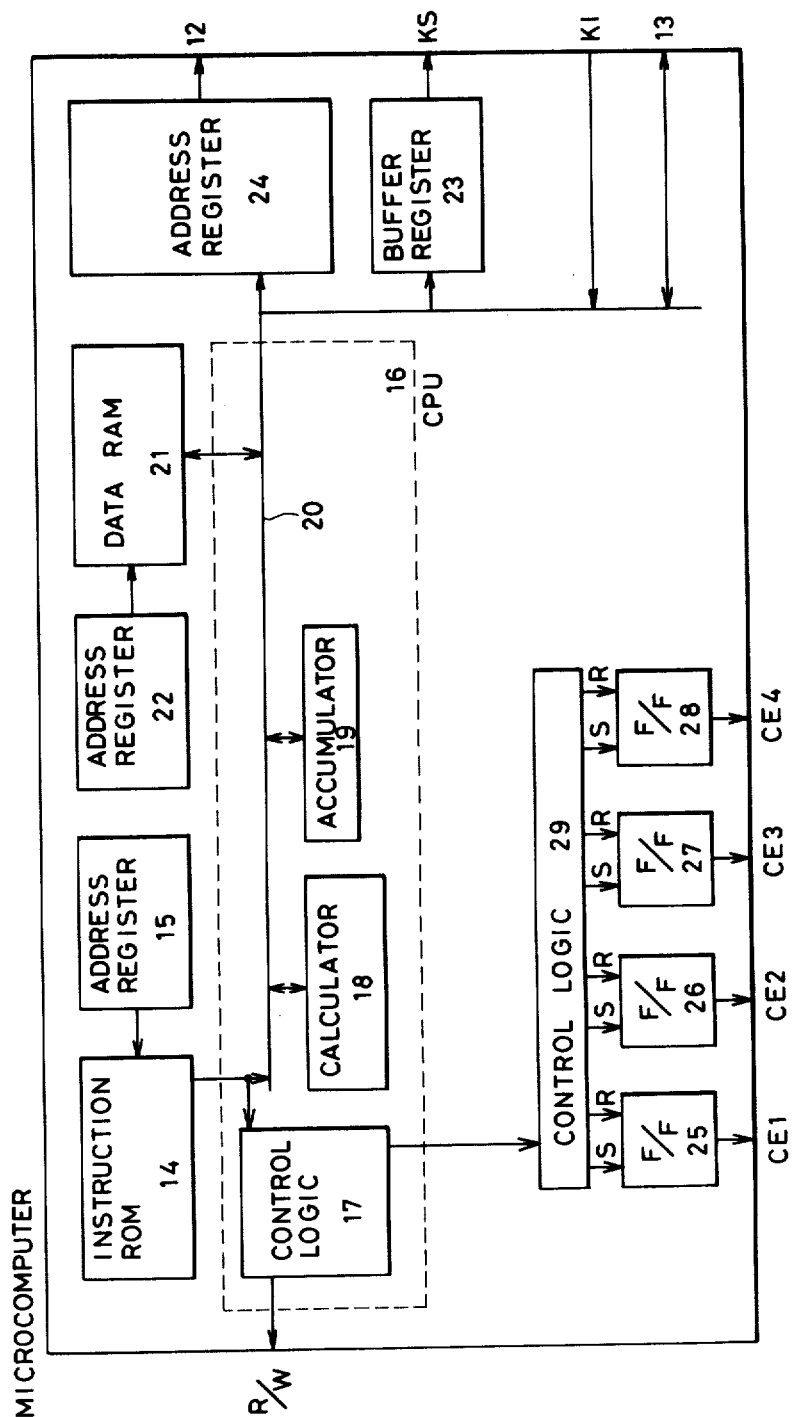

FIG. 3(a) shows a block diagram of the microcomputer 8 of FIG. 2. An instruction ROM 14 stores a number of kinds of instruction, each of which is used to perform a specific operation by the translator and is, preferably, in coded format. As the address of a ROM address register 15 is, in turn, advanced, the ROM 14 provides a specific instruction. The specific instruction is applied to a CPU 16 so that the CPU 16 understands its instruction to provide the selected operation.

The CPU 16 comprises a control logic 17, a logic calculator 18, and an accumulator 19. An internal data bus is indicated by the reference numeral 20. Data RAM 21 is provided for preliminarily containing data used for the translator and for functioning as a conditional flip-flop used for a branch in a program operation. Data from the CPU 16 is stored in a specific location within the data RAM 21 which location is selected by a RAM address register 22. The data stored in such a location within the RAM 21 is applied to the CPU 16.

Reference numeral 23 represents an output buffer register for outputting key strobe signals KS in turn to the key matrix circuit 7 so that the output of this circuit 7 is applied to the CPU 16 as key input signals KI. Reference numeral 24 indicates an address register for selecting the address of the external memory including the ROM's 9 to 11 and a RAM circuit within the driver 6. The output of the address register 24 is fed through the address bus 12. Control of the address register 24 to select increment or decrement and a certain address is carried out by the CPU 16. Since the CPU 16 is coupled to the data bus 13 as shown in FIG. 2, transmission of the data between the CPU 16 and the external memory is accomplished by use of the data bus 13. The direction of transmission of the data between them is defined with the read/write signal R/W.

Each of flip-flop circuits 25 to 28 is set or reset by a control logic 29. The control logic 29 is controlled by the CPU 16. The output of each of the flip-flops 25 to 28 is referred to as chip selection signals $CE_1$ to $CE_4$, respectively.

Figure 3B:
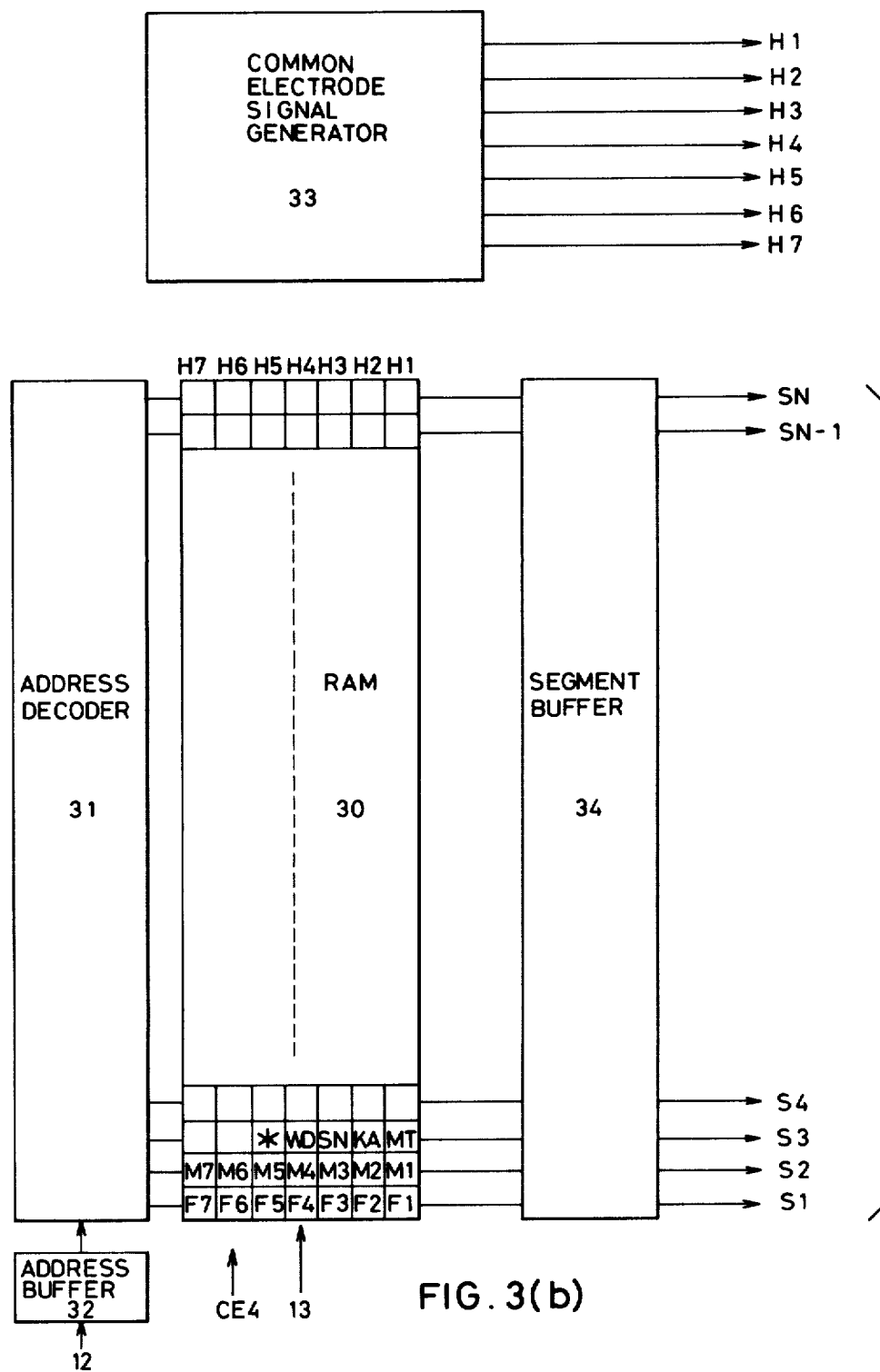

FIG. 3(b) shows a block diagram of the driver 6 of FIG. 2. According to a preferred embodiment of the present invention, the indicator 2 comprises a liquid crystal display. The character indicator 3 is formed as a 5×7 dot matrix in a single digit. One symbol of the language indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when information of "1" is written in a certain bit of the RAM 30, a particular dot (segment) of the indicator 2 corresponding to the certain bit is indicated. When information of "0" is stored in a certain bit of the RAM 30, a particular dot (segment) of the indicator 2 corresponding to the bit is made dark.

In FIG. 3(b), $S_1$, $S_2$ and $S_3$ refer to segment electrode signals used for illuminating symbols. $S_4$ to $S_N$ refer to segment electrode signals used for indicating characters. $H_1$ to $H_7$ represent common electrode signals. $M_1$ to $M_7$ represents a symbol " ▲ " of the language indicator 4, the symbol indicating the mother or original language which is to be translated with the translator of the present invention. $F_1$ to $F_7$ represent another symbol " ▲ " of the same indicator 4, this symbol indicating the foreign or translated language into which the translator of the present invention translates a selected word or words from the original language.

Further in FIG. 3(b), numerals 1 to 7 when used as the suffixes are intended to refer to English, German, Japanese, French, Spanish, another language "○", and further language "▲", respectively. MT indicates a multivocal word. KA indicates a Japanese "Katakana" letter. SN represents a sentence while WD represents a word. A star "*" indicates that each of words represented in the mother or original language is translated into each of corresponding words represented in the foreign or translated language while the grammatical correction and modification meeting with that foreign language is not carried out.

The driver 6 provides display signals to the indicator 2 when display data is produced by the microcomputer 8 to apply them to the RAM 30. Since the driver 6 is of otherwise conventional design, further description thereof is omitted.

Figure 4:
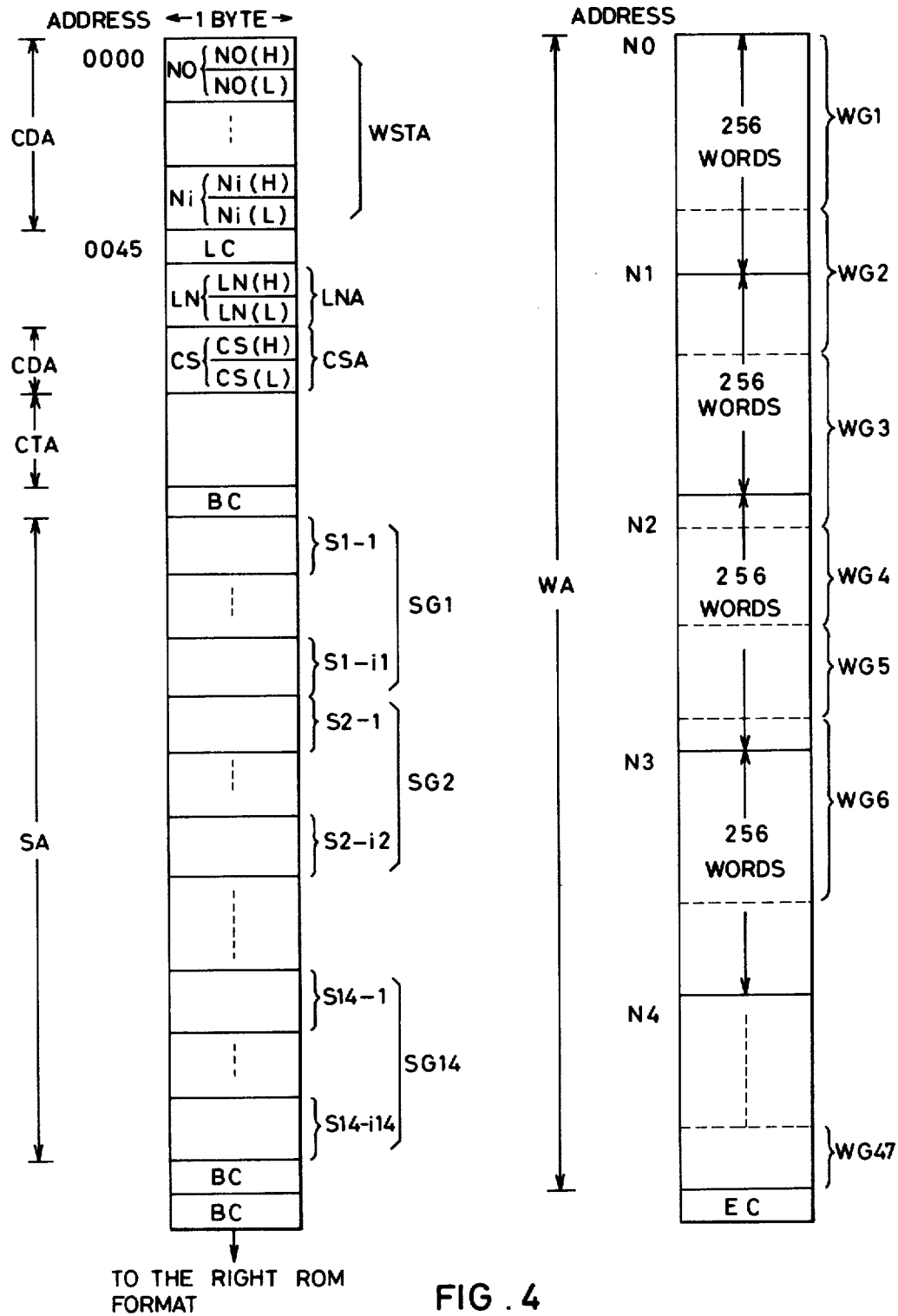
FIG. 4 shows a format of a ROM for storing words, the ROM being connected in the circuit of FIG. 2.

FIG. 4 shows a format in which a great number of words are stored in each of the ROM's 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words is determined to detect those spellings having high frequency in occurrence. The thus selected English spelling is changed to corresponding compression codes for data storage purposes. The data-compression table CTA stores data for ascertaining the correspondence between the selected spellings and the compression codes.

When correspondence between an input words and one or word stored in one of the ROM's is to be detected, the input word is changed to codes inclusive of one of the compression codes according to the contents of the data-compression table CTA since each of the ROM's stores codes which may include one of the compression codes. The table CTA is used to show words stored in one of the ROM's by changing the codes to the original spelling. This table is different depending on the language to make the degree of data compression the greatest.

Stored words are classified in 47 categories in each of which a number of words are ordered. In FIG. 4, a word category "n" is referred to WGn. Sentences are formed by a combination of a plurality of stored words. These sentences are classified in 14 categories, in each of which a number of sentences are ordered. In FIG. 4, a sentence category "m" is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows the relationship between the serial number of the category and the name of the category.

TABLE 1 - 1

| The serial number of the category | corresponding key | the name of the category |
|---|---|---|
| 1 | "ra" or "c" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |

TABLE 1 - 1-continued

| The serial number of the category | corresponding key | the name of the category |
| --- | --- | --- |
| 14 | "SPC" or "o" | emergency |

Each category for the words may contain 256 words. A first word address table region WSTA contains a first address referred to as $N_0, N_1, N_2, \ldots N_4$; in FIG. 4. This first address is related to a location in which a first code or first compressed code for representing the first word is stored. In accordance with a specific example of the present invention, each address is represented by two bytes. Each first address is separated in to an upper byte referred to No(H) to Ni(H) and a lower byte referred to No(L) to Ni(L). The first word address table region is used to shorten retrieval time for a specific word.

CS is used to refer to a first sentence address CS(H) and CS(L) which is stored in a first sentence address region CSA. LNA indicates a memory location for storing a serial number of a word indicating the specific language as referenced by LN of LN(H) and LN(L). More particularly, as the ROM storing English words is concerned, a word "English" is necessarily contained in that ROM. In such a case, the serial number of the word "English" in the ROM is LN starting from the first word of the same kind of word group. Storing the serial number LN is suitable for showing the mother language and the foreign language being selected in the character indicator 3 because it is unnecessary to additionally store a word showing the language.

The translator of the present invention may comprise audible sound generating means for developing words represented in the mother language and/or the foreign language. Since such an audible sound generating means is disclosed in, for example, Hyatt, U.S. Pat. No. 4,060,848 issued Nov. 29, 1979, further description thereof is omitted.

In FIG. 4, LC indicates a language code in which bits indicate a field of language stored in the ROM and the last four bits the kind of language stored in the ROM. In particular, there may be present a ROM for storing words oriented to economy, engineering or medicine, respectively. Information representing such a field is stored in LC. The last four bits corresponds to each language as follows:

TABLE 1 - 2

| The last four bits | the language |
| --- | --- |
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another language "O" |
| 0 1 1 1 (7) | a further language "▲" |

In FIG. 4, BC, "11111111" is a boundary code and EC "11111111" is an end code of the ROM.

According to a main feature of the present invention, a specific kind of word data or sentence data subjected to retrieval can be specified by marking them. For this special purpose, in FIG. 1, a sentence/mark key 41 referenced by the legend "SN/MK" and a mark key 42 referenced to as "MK" are provided. The "SN/MK" key 41 is actuated for as long as a specific category is selected from the 47 categories in which a specific group of word data and/or sentence data is stored. One actuation of the "SN/MK" key 41 enables the user to address all of the sentences grouped in the selected category. Two successive actuations upon this key 41 enables the user to address only the marked sentences that are grouped in the selected category.

The "MK" key 42 is actuated to mark one of the stored sentences after modification of one or more modifiable words that are so specified by their enclosure within parentheses in one of the stored sentences, or without any modification of one of the stored sentences. A search key 43, referred to as "SRC" in FIG. 1, is a key for enabling one to search through the sentences. A translation key 44 referred to as "TRL" in FIG. 1 is for enabling the user to translate one of the sentences.

Figures 5, 6:
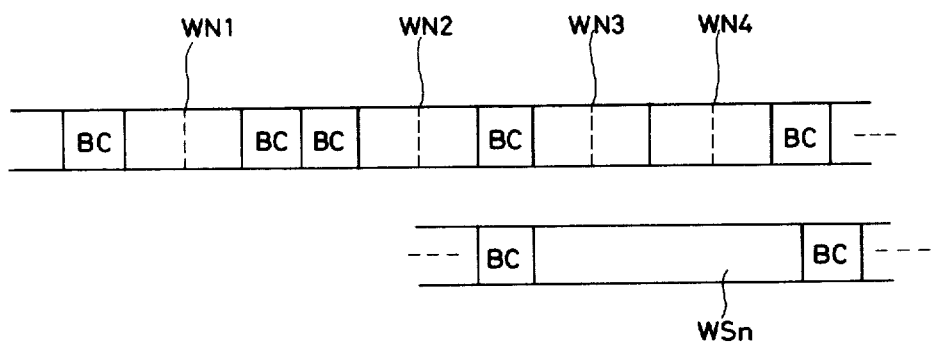
FIG. 5 shows a table stored in a memory element of the FIG. 3(a) circuit.
FIG. 6 shows a format stored in a memory element of the FIG. 3(a) circuit.

FIG. 5 shows a table stored in some locations in the data RAM 21 in the FIG. 3(a) circuit. Each of the bits in the table of FIG. 5 is utilized for showing whether a specified sentence is marked or not. In the table of FIG. 5, the serial number of a bit corresponds to the serial number of as address according to which the sentence is stored in the sentence data region SA in FIG. 4. In FIG. 5, a bit "1" indicates that the corresponding sentence is marked while bit "0" indicates that the corresponding sentence is not marked. In FIG. 5, sentences numbered as the 3rd, the 6th, the 7th, the 9th, the 11th, the 12th and so on in the sentence data region SA in FIG. 4 are marked.

FIG. 6 shows a memory format stored in some other locations in the data RAM 21. The memory format of FIG. 6 is used in cases where one or more changeable words enclosed in a specification member, for example, parentheses, in one of the sentences to be marked may be replaced by one or more others. The one or more changeable words that may be inserted between the parentheses are stored in the data RAM 21.

In FIG. 6, "BC" indicates a boundary code for separation, and "WNn" contains the serial number or numbers of the one or more changeable words that may be inserted. According to the serial number or numbers, the one or more changeable words are stored in the word data region WA in FIG. 4. The serial number or numbers are constructed by two bytes. "$WS_n$" contains the spelling of the one or more changeable words that may be inserted between the parentheses in one of the sentences. Between the two adjacent "BC" codes, there is contained information for the one or more changeable words that may be inserted between the parentheses in a particular one of the sentences.

As compared with the table of FIG. 5, for example, the "$WN_1$" location in the FIG. 6 format includes the serial number or numbers of the one or more changeable words that may be inserted between the parentheses in the 3rd sentence, or the spelling of the one or more changeable words. With respect to the 6th sentence which is the next marked sentence, the "$WN_2$" location contains no information for the one or more changeable words. Therefore, the whole 6th sentence is addressed without any change. This can occur where no parentheses are provided in the 6th sentence or any changeable word(s) in the 6th sentence is not inserted. The "$WN_3$" and "$WN_4$" locations are related to the changeable words to be inserted in the 9th sentence. In this sentence, two changeable words may be inserted.

While the sentence data region SA in FIG. 4 stores the sentences, the table of FIG. 5 indicates which one of the sentences is marked. When some word in one of the sentences is replaced by another, the format of FIG. 6 stores the spelling of the new word or the serial number of the new word stored in the memory in FIG. 4.

Figure 7:
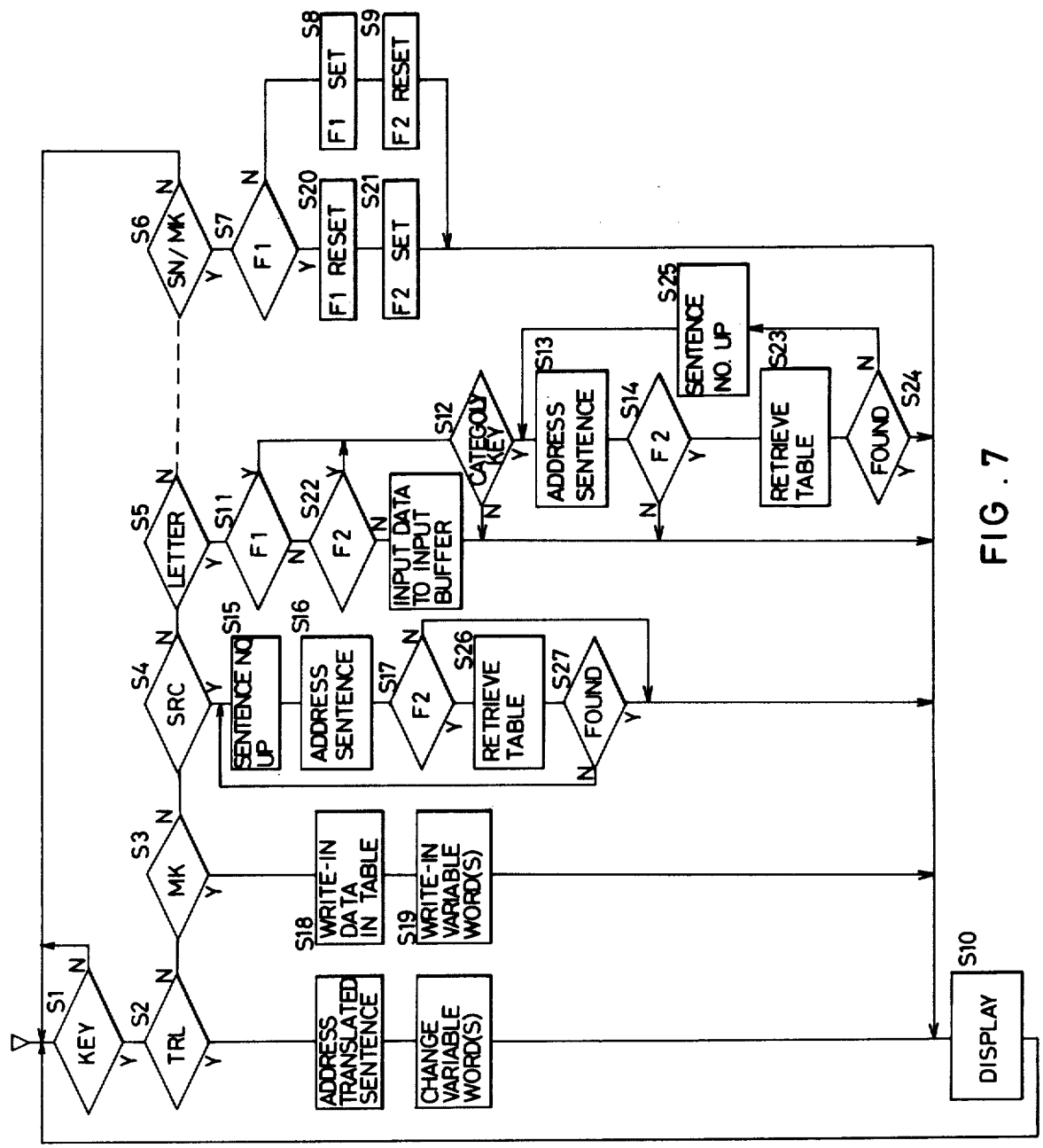
FIG. 7 shows a flow chart of the translator according to the present invention.

FIG. 7 shows a flow chart of the operation by the translator according to the present invention.

(1) Addressing sentences $S_6$ is selected by actuating the "SN/MK" key 41. A flag $F_1$ is provided for indicating a sentence addressing mode. Another flag $F_2$ is provided for indicating a marked sentence addressing mode. The flag $F_1$ is reset in the initial state. The flags $F_1$ and $F_2$ are provided within the data RAM 21 in FIG. 3(a). In $S_8$, the flag $F_1$ is set. In $S_9$, the flag $F_2$ is reset. A desirable one of the category keys $L_1$ to $L_{14}$ in FIG. 1 is depressed so that a leading sentence in the selected category is addressed as referred to $S_5 \rightarrow S_{11} \rightarrow S_{12} \rightarrow S_{13} \rightarrow S_{14} \rightarrow S_{10}$. Upon actuation of the "SRC" key 43, $S_{13}$ is selected to count up the serial number of the sentence by one and to select the next sentence for display purposes as referred to $S_4 \rightarrow S_{15} \rightarrow S_{16} \rightarrow S_{17} \rightarrow S_{10}$.

(2) Marking operation

After a desired sentence is addressed, the "MK" key 42 is actuated. The table of FIG. 5 is retrieved. The bit of the table corresponding to the serial number of the addressed sentence in the sentence data region SA in FIG. 4 is set, so that the desired sentence is marked. In the case where the addressed sentence includes parentheses enclosing one or more changeable words and where the one or more changeable words are replaced by another or others, the "BC" code and the serial number of the new word or words in the word data region WA in FIG. 4, or the spelling of the new word or words are recorded in the format of FIG. 6, as referred to $S_3 \rightarrow S_{18} \rightarrow S_{19}$. When the addressed sentence is not to be changed, only the "BC" code is recorded. Their recording portions are related to the bit set in the table of FIG. 5.

(3) Addressing the marked sentences

Two successive operations of the "SN/MK" key 41 cause the flag $F_2$ to be set in $S_6 \rightarrow S_7 \rightarrow S_{20} \rightarrow S_{21}$. When one of the category keys is actuated, the leading sentence in the selected category is retrieved in $S_5 \rightarrow S_{11} \rightarrow S_{22} \rightarrow S_{12} \rightarrow S_{13}$. In $S_{14}$, the flag $F_2$ is set. In $S_{23}$, the table formed in the data RAM 21 is retrieved. In $S_{24}$, it is determined whether the sentence is marked or not. When the sentence is not marked, the serial number is counted up to address the next sentence in $S_{25} \rightarrow S_{13}$.

When the sentence is marked, the sentence is displayed in $S_{24} \rightarrow S_{10}$. Upon actuation of the "SRC" key 43, the serial number is counted up to address the next sentence. It is then detected whether the next sentence is marked or not in $S_4 \rightarrow S_{15} \rightarrow S_{16} \rightarrow S_{17} \rightarrow S_{28}$. When the next sentence is marked, this is displayed.

(4) Translation

The actuation of the "TRL" key 33 enables the displayed sentence to be translated to provide a translated sentence having the same serial number as the displayed sentence.

A specific type of ROM stores a great number of words and sentences as shown in FIG. 4. Each of the stored words and sentences corresponds to a respective one of the translated words and sentences in the other ROM's. This correspondence is assured by the serial numbers of words and sentences which are in common between the ROM's. More particularly, a specific sentence "GOOD MORNINGS." is assumed to be stored as the 100th sentence in a ROM that stores data corresponding to English words and sentences.

The corresponding Japanese sentence is stored as the 100th sentence in another type of ROM that is related to Japanese. A further corresponding German translated sentence "GUTEN MORGEN." is stored similarly as the 100th sentence in a further type of ROM that is related to German.

Similarly, the same technique can be applied in connection with words so that a specific word ordered at a particular serial number in one ROM corresponds to its translated word ordered at the like serial number in another ROM.

Conducting the translation by the translator lies in finding the serial number of a word or a sentence in the mother language ROM and, accordingly thereafter, in detecting the translated word or sentence having the like serial number in the foreign language ROM.

The translation operation comprises the following steps:
 (i) the first step: selecting a specific ROM of the mother language;
 (ii) the second step: detecting the serial number of a desired word or a sentence in the thus selected ROM;
 (iii) the third step: selecting another specific ROM of the selected foreign language; and
 (iv) the fourth step: detecting the translated word or sentence having the like serial number in the another ROM.

When one or more changeable words in the sentence addressed are changed to another, it is necessary that the new word or words inserted be translated the corresponding word or words in the foreign language. This is accomplished by the corresponding translated word or words having the same serial number or numbers as the new word or words. When the new word or words are a proper noun or another untranslated word, the spelling of the new word or words is addressed as such.

According to the present invention, the sentences can be addressed within a shorter time due to the marking operation. The addressed sentence is partially modified after which the modified sentence is addressed. A power battery may be provided for supplying the memory power necessary for memorizing one or more modifying word elements to make the modified sentence. In such a case, even when the main power switch is turned off in the translator, the one or more modifying word elements may be stored.

Although the above description is related to the sentence data, it is to be noted that the word data can be marked and addressed in the similar manner as described above.

While only certain embodiments of the present invention have been described, it will be apparent to those skilled in the art that various changes and modifications may be made therein without departing from the spirit and scope of the invention claimed.

What is claimed is:

1. An electronic translator of the type having an input device for inputting words and directing output of words and a memory means from which a first word or words represented in a first language are retrieved in response to a second word or words represented in a second language equivalent to the first word or words, the first and second words being stored in the memory means, wherein the improvement comprises:
 marking means responsive to the input device for marking at least one selected data item of a plurality of data items as stored in the memory means each representing the second word or words to differentiate each selected data item from other data items in the second language stored in the memory means; and output means responsive to a command from the input device for selectively outputting only the at least one data item which is marked by the marking means.

2. The translator of claim 1, wherein the memory means stores the plurality of data items each representing the second word or words in such a manner that the plurality of data items are classified depending upon the type of the second word or words.

3. An electronic translator of the type having an input device for inputting words and directing output of words and a memory means from which a first word or words represented in a first language are retrieved in response to a second word or words represented in a second language equivalent to the first word or words, the first and second words being stored in the memory means, wherein the improvement comprises:

marking means responsive to the input device for marking at least one selected data item of a plurality of data items stored in the memory means each representing the second word or words to differentiate each selected data item from other data items in the second language stored in the memory means;

table means within the memory means for storing the marked condition of the at least one data item as imposed by the marking means as well as the unmarked condition of the at least one data item; and output means responsive to a command from the input device for selectively outputting only the at least one data item which is marked by the marking means.

4. The translator of claim 3, wherein the table means is adapted to store the serial number of the at least one selected data item of the plurality of data items, which is marked by the marking means.

5. An electronic translator of the type having an input device for inputting words and directing output of words and a memory means from which a first word or words represented in a first language are retrieved in response to a second word or words represented in a second language equivalent to the first word or words, the first and second words being stored in the memory means, wherein the improvement comprises:

marking means responsive to the input device for marking at least one selected data item of a plurality of data items as stored in the memory means each representing the second word or words to differentiate each selected data item from other data items in the second language stored in the memory means;

additional memory means for storing additional word data added to the at least one selected data item of the plurality of data items, so that an original part of the at least one selected data item is replaced by the additional word data; and output means responsive to a command from the input device for selectively outputting only the at least one data item which is marked by the marking means and which includes the additional word data.

6. The translator of claim 5, wherein when the additional word data is stored in the memory means for storing the plurality of data items each representing the second word or words, the additional memory means being adapted to store the serial number of the additional word data in the memory means.

7. An electronic translator of the type having an output device for inputting words and directing output of words and a memory means from which a first word or words represented in a first language are retrieved in response to a second word or words represented in a second language equivalent to the first word or words, the first and second words being stored in the memory means, wherein the improvement comprises:

marking means responsive to the input device for marking at least one selected data item of a plurality of data items as stored in the memory means each representing the second word or words to differentiate each selected data item from other data items in the second language stored in the memory means;

access means provided for addressing the memory means to cause retrieval of the first word or words; and output means responsive to a command from the input device for selectively outputting only the at least one data item which is marked by the marking means.

* * * * *